(12) United States Patent
Zhang

(10) Patent No.: US 8,994,351 B2
(45) Date of Patent: Mar. 31, 2015

(54) SMOOTH MODE TRANSITION PLATEAU FOR A POWER SUPPLY CONTROLLER

(75) Inventor: Guangchao Zhang, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 171 days.

(21) Appl. No.: 13/196,769

(22) Filed: Aug. 2, 2011

(65) Prior Publication Data
US 2013/0033902 A1 Feb. 7, 2013

(51) Int. Cl.
H02M 3/156 (2006.01)
H02M 7/217 (2006.01)
H02M 3/335 (2006.01)
H02M 1/00 (2006.01)

(52) U.S. Cl.
CPC ........ H02M 7/2176 (2013.01); H02M 3/33523 (2013.01); H02M 2001/0025 (2013.01); H02M 2001/0032 (2013.01); H02M 2001/0054 (2013.01); Y02B 70/1491 (2013.01); Y02B 70/16 (2013.01); Y10S 323/908 (2013.01)
USPC ......................................... 323/284; 323/908

(58) Field of Classification Search
CPC ................................................ H02M 3/33523
USPC ......... 323/282, 283, 284, 285, 271, 351, 908; 363/41, 42, 43, 55, 56, 131, 132, 363/21.12, 21.18, 97, 21.15, 21.01, 15, 157, 363/165, 171, 164, 56.03, 8, 9
See application file for complete search history.

(56) References Cited

U.S. PATENT DOCUMENTS 6,249,876 B1 * 6/2001 Balakrishnan et al. ....... 713/501
7,208,995 B2 * 4/2007 Hashimoto ................... 327/536
2002/0008501 A1 * 1/2002 Telefus et al. ................. 323/282
2002/0105767 A1 * 8/2002 Schuellein et al. .......... 361/93.1
2006/0109039 A1 * 5/2006 Wu ................................ 327/172
2008/0084713 A1 4/2008 Baurle et al.
2009/0302817 A1 * 12/2009 Nagai ........................... 323/282
2010/0271849 A1 * 10/2010 Grant et al. ................ 363/21.15
2011/0187339 A1 * 8/2011 Trattler et al. ................ 323/283
2011/0193494 A1 * 8/2011 Gaknoki et al. .............. 315/297
2011/0273910 A1 * 11/2011 Baurle et al. .............. 363/21.01

OTHER PUBLICATIONS

Texas Instruments, "TPS43000 Multi-Topology High-Frequency PWM Controller," Oct. 2001 (29 pages).
STMicroelectronics, "L6566B Multi-Mode Controller for SMPS," Revision 3, Dec. 2008, pp. 1-51.

* cited by examiner

*Primary Examiner* — Matthew Nguyen
*Assistant Examiner* — Trinh Dang
(74) *Attorney, Agent, or Firm* — Blakely Sokoloff Taylor & Zafman LLP

(57) ABSTRACT

A power supply includes a drive signal generator to generate a drive signal to control a switching of power switch. A feedback circuit is coupled to receive a feedback signal representative of the output to generate a control signal. An oscillator circuit is coupled to generate an oscillating signal in response to the control signal, from which the drive signal is generated in response. A frequency of the oscillating signal increases from a first frequency to a second frequency with respect to the control signal for a first range of control signal values, remains substantially equal to the second frequency for a second range of control signal values, and decreases from the second frequency to a third frequency with respect to the control signal for a third range of control signal values. The first range is less than the second range, which is less than the third range.

18 Claims, 5 Drawing Sheets

SMOOTH MODE TRANSITION PLATEAU FOR A POWER SUPPLY CONTROLLER

BACKGROUND INFORMATION

1. Field of the Disclosure

The present invention relates generally to power supplies, and in particular but not exclusively, relates to controllers for switch mode power supplies.

2. Background

A wide variety of household or industrial appliances require a regulated direct current (dc) source for their operation. Different types of switch mode power supplies are often utilized to convert low frequency (e.g., 50 Hz or 60 Hz) alternating current (ac) or high voltage dc input mains to a regulated dc output voltage at the output of the power supply. Switch mode power supplies are popular because of their small size due to high frequency operation, well regulated outputs, high efficiency, and the safety and protection features that are provided.

In general, a switch mode power supply includes a switching element accompanied with an energy transfer element, such as for example a high frequency transformer, which provides safety isolation. In many examples, the energy transfer element transforms the input voltage level to a lower output voltage level. The output of the transformer is then rectified and filtered to provide a regulated dc output to be provided to an electronic device. The controller for the switch mode power supply typically senses the output of the switch mode power supply in a closed loop to regulate the output.

Some common control methods used in the controllers for switch mode power supplies to regulate the output versus load and line variations are the pulse width modulation (PWM), pulse frequency modulation (PFM), ON-OFF control or pulse skipping.

One popular topology utilized for a switch mode power supply is a flyback converter. When the switch is closed in a flyback converter, energy is stored in the primary inductance of the energy transfer element because of the blocking direction of the secondary diode cannot transfer to the secondary winding and load. However, when switch opens, the stored energy is transferred to the load by the reversed direction of current. The output regulation of the power converter is through processing the feedback from output to generate an internal signal, which may be referred to as a control signal to regulate the output.

The feedback signal from the output can come through an opto-coupler from a sense circuit coupled to the dc output. This feedback is referenced to the secondary ground it is referred as the secondary control. In some switch mode power supplies, the output sense that generates the feedback or control signal may be extracted indirectly from a third winding that is magnetically coupled to the secondary winding on the same transformer core. In this example, the feedback signal may be referenced to the primary ground may therefore be referred to as the primary control. The third winding in some cases also provides the operating power for the power supply controller and is sometimes referred to as a bias or feedback winding. The feedback or control signal may then be used by the controller of the switch mode power supply to, for example, modulate the pulse width (i.e., PWM), change switching frequency (i.e., PFM) or disabling some switching cycles (pulse skipping) of a drive signal used to switch the power switch of the switch mode power supply to regulate the output.

Voltage mode control with fixed frequency and ON-time control, usually referred as pulse width modulation (PWM), is typically better suited for high load regulation while the pulse skipping control, also referred as burst mode, is typically utilized for regulation at low loads. Control methods such as fixed on-time, variable off-time or fixed off-time, variable on-time even though they result in switching period time change, would still fit in definition of PWM control.

Current mode control may utilize a fixed switching frequency. In current mode control schemes, the on-time of each pulse of the drive signal is terminated when the current flowing in the power switch reaches the current limit threshold of the pulse peak value. In this control method, power switch current ramps up linearly when the power switch is on until the power switch current reaches the current limit threshold. The power switch is then turned off and the current limit threshold is varied to regulate the output. The peak current control mode is also considered as PWM control. In some examples of switch mode power supply controller, in order to improve light load efficiency and no-load power consumption, the switching frequency and current limit level may be reduced in response to a load drop.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Figure 1:
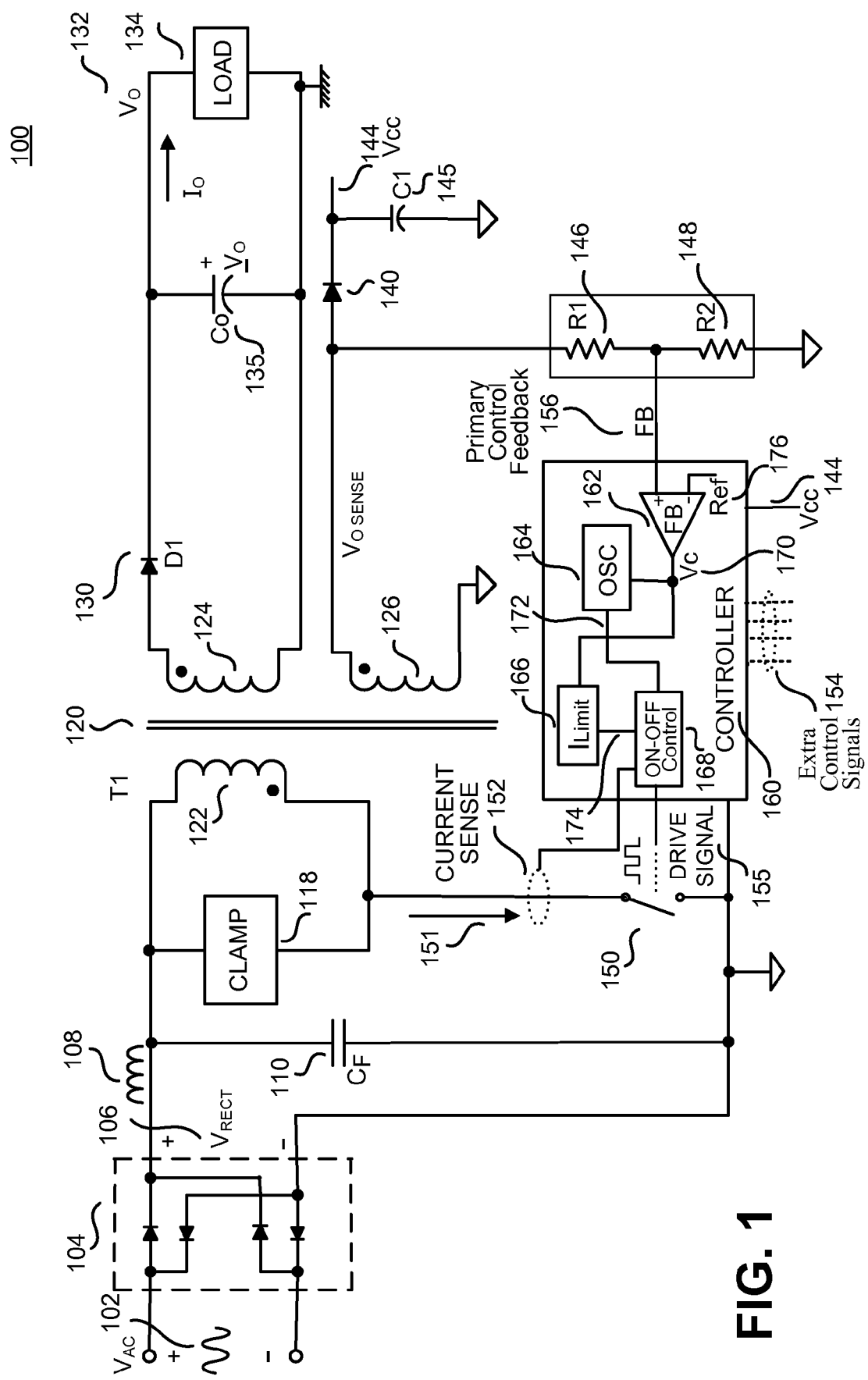
FIG. 1 is an example block diagram illustrating generally one example of a power supply including a power supply controller featuring a smooth transition plateau in accordance with the teachings of the present invention.

Methods and apparatuses for controlling a switched mode power converter are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

It is appreciated that in description below and in all examples that a switch mode power supply may include an integrated circuit (IC) holding different circuitry of a controller that may also include some switching and power devices in a monolithic or in a hybrid structure.

It is noted that for the power supply control schemes in which the skipped cycles do not result in a considerable change in overall switching frequency, that these power supply control schemes are still considered to be of duty cycle modulation or PWM control since the overall switching frequency is not changed considerably. However, if it is required to skip a large number (e.g., a large percentage) of cycles that result in switching frequency change, then this power supply control scheme is considered to be pulse frequency modulation (PFM) control. These various power supply control schemes regulate the power delivered through varying the power switch on-time as a proportion of the switching cycle time period, which may be referred to as duty cycle control. In some applications, in order to achieve a desired result of regulation at different loads and different input voltage levels, a multi-mode combination of the PWM control methods could be used in accordance with the teachings of the present invention.

One key challenge in implementing multiple modes of duty cycle control in a power converter is ensuring a smooth transition between operating modes. The transition between modes normally introduces some change or discontinuity in the control loop gain of the power converter since each mode of duty cycle control has distinct characteristic in term of control loop gain depending on the operating conditions of the power converter.

Some known solutions exist such as inserting a hysteresis at the border of transition between operating modes to ensure that any change in the control loop gain during transition from one control mode to another control mode does not result in control loop instability that may potentially cause oscillation between modes and rising the output voltage ripple of the converter, audible noise and even damage to certain components within the power converter.

Another key challenge in implementing multiple modes of duty cycle control is to maintain a low cost solution by minimizing number of terminals for implementation of multi-mode control. In some cases, multi-mode control for transitions from one PWM control mode to another requires extra terminals to sense the load condition for transition. Such extra terminals are usually coupled to an additional winding on the energy transfer element of the power supply to detect the period of energy delivery during each switching cycle, which changes with load conditions. It is detected by sensing a voltage on the additional winding on the energy transfer element ringing to low level, which indicates that energy delivery to the output is complete for that switching cycle.

In general, a goal of multi-mode control is maintaining a high efficiency across a wide load range while employing the low cost packaging by a minimum addition of terminals and devices.

In traditional controllers that implement multi-mode solutions, the peak current control pulse width modulation, the switching frequency, and the peak operating current limit are controlled in multiple regions. The switching frequency and current limit level are reduced with load reductions to reduce switching losses and to improve/increase efficiency at the light loads. At very low load/no load conditions, the operation is at burst mode with skipped switching pulses to fulfill the no-load input power consumption, which are required by the regulatory standards for efficiency and no-load/standby power consumption.

When operating in a peak current control pulse width modulation mode, increases in the current limit level result in an increase in power switch on-time, which result in an increase of the transfer of energy to the output. As the output load of the power supply increases, the current limit and switching frequency are increased by the controller up to a maximum switching frequency. A problem with a classic peak current control pulse width modulation mode is the sub-harmonic oscillations that can occur in a fixed frequency or increased frequency by any disturbance in oscillator or in switch timing. As the on-time of the power switch increases to increase power delivery, and as the duty cycle exceeds 50%, the power supply controller is more susceptible to the sub-harmonic oscillations.

As will be discussed in greater detail below, in order to address the sub-harmonic oscillations, examples of a power supply controller in accordance with the teachings of the present invention utilize an advanced mode of operation that may be referred to as extended on-time modulated off-time. In one example of peak current control with controlled variable current limit and frequency, the maximum switching frequency of the converter is estimated to happen at around 50% of the rated current limit where duty cycle is less than 50%. An example controller with extended on-time modulated off-time utilizes the frequency and current limit control in response to load variations and could extend the on-time and duty cycle beyond the critical value of 50% at maximum frequency without risk of sub harmonic oscillations in accordance with the teachings of the present invention.

In one example, a power supply controller utilizes a classic peak current control pulse width modulation mode and variable switching frequency for lighter loads, which results in peak current limits of, for example 25% to 50% of the maximum current limit. For heavier loads that result in a drive signal duty cycle of greater than 50%, an extended on-time modulated off-time mode is utilized to reduce the risks of sub harmonic oscillations. In addition, an intermediate mode is also introduced in an example for the intermediate loads to provide a smooth transition between the modes, which results in peak current limits of, for example, greater than 50% for drive signal duty cycles of less than 50%. In this intermediate mode, the switching cycle frequency is maintained or fixed at a plateau of the maximum switching frequency of the power supply controller and the peak current is increased from 50% with respect to the load until the duty cycle reaches 50% in accordance with the teachings of the present invention.

Thus, a power supply controller with a smooth mode transition plateau is introduced in accordance with the teachings of the present invention. In one example, a power supply controller includes a drive signal generator that is coupled to generate a drive signal, which drives a switching of a power switch to control a transfer of energy from an input of a power supply to an output of the power supply. The controller includes feedback circuit that is coupled to receive a feedback signal representative of the output of the power supply. The feedback circuit is coupled to generate a control signal in response to the feedback signal and an oscillator circuit is coupled to generate a variable frequency oscillating signal in response to the control signal. The drive signal generator is coupled to generate the drive signal in response to the oscillating signal. A frequency of the oscillating signal increases from a first frequency to a second frequency with respect to the control signal for a first range of control signal values. The frequency of the oscillating signal remains substantially equal to the second frequency for a second range of control signal values and the frequency of the oscillating signal decreases from the second frequency to a third frequency with respect to the control signal for a third range of control signal values. The first range of control signal values is less than the second range of control signal values and the second range of control signal values is less than the third range of control signal values.

To illustrate, FIG. 1 shows generally a block diagram illustrating one example of a power supply 100 including an energy transfer element 120 and a controller 160 featuring a smooth transition plateau in accordance with the teachings of the present invention. In the illustrated example, energy transfer element 120 is a transformer including a primary winding 122, secondary winding 124 and a third winding 126. In the illustrated example, power supply 100 is a flyback power converter 100 with controller 160 in a primary control configuration in which a feedback signal $V_{FB}$ 156 referenced to the primary ground is generated through the third winding 126. The input of power supply 100 is coupled to receive $V_{AC}$ 102 from an ac line. $V_{AC}$ 102 is rectified through bridge rectifier 104, the rectified voltage $V_{RECT}$ 106 is a full-wave 108 that is filtered by the filter capacitance $C_F$ 110. In one example, it is appreciated that value of the filter capacitance $C_F$ 110 is not very big and the input dc voltage may moderately drop at higher loads. In one example, the dc voltage applied to the primary winding 122 of the energy transfer element 120 may increase gradually with reductions in the load. As shown in the depicted example, the dc voltage is chopped by the power switch 150 in response to drive signal 155.

In particular, when power switch 150 is switched on in response to drive signal 155, current 151 flowing in primary winding 122 of the energy transfer element 120 stores energy in the magnetic core and because of blocking direction of diode D1 130 coupled to secondary winding 124, energy transfer element 120 cannot transfer energy to the load. However, when power switch 150 is switched off in response to drive signal 155, the reverse direction of current at secondary winding 124 is conducted through diode D1 130 to charge bulk capacitor $C_o$ 135 and provide a filtered output voltage $V_o$ 132 across the load 134. In this configuration of the primary control, the feedback for output regulation is retrieved from a third winding 126 coupled to the secondary winding 124 on the same core of energy transfer element 120.

In the example configuration of FIG. 1, the voltage induced in the third winding 126 is directly sampled through the resistive divider that includes R1 146 and R2 148. The scaled down induced feedback signal $V_{FB}$ 156 is applied to the FB pin of controller 160. In the example, the feedback signal VFB 156 is representative of the output voltage $V_O$ 132 of the power supply 100 during an OFF time of power switch 150 when secondary diode D1 130 is conducting current. In one example, the third winding 126 may also provide the supply voltage $V_{CC}$ 144 for the controller 160 through rectifier 140 and filter capacitance C1 145 as shown. In one example, controller 160 receives also a current sense 152, which is representative of current 151. In one example, based on the application, there may also be extra control signals 154 received by controller 160 to generate drive signal 155 to control switching of the switch 150 to control the transfer of energy from the input of the power supply 100 to the output of the power supply in accordance with the teachings of the present invention.

As shown in the depicted example, controller 160 includes a feedback circuit 162, which is also labeled "FB" in FIG. 1, which is coupled to receive the feedback signal $V_{FB}$ 156 and a feedback reference signal 176. In one example, feedback circuit 162 includes a comparator that generates control signal $V_C$ 170 in response to a comparison of feedback signal $V_{FB}$ 156 and feedback reference signal 176. In one example, the control signal $V_C$ 170 is representative of load 134 coupled to the output of the power supply 100. Thus, in one example, control signal $V_C$ 170 increases in magnitude in response to the load 134 increasing from lighter loads to heavier loads.

In one example, controller 160 also includes a current limit adjustment circuit 166, which is also labeled "$I_{LIMIT}$" in FIG. 1, which is coupled to receive the control signal $V_C$ 170. In the example, current limit adjustment circuit 166 generates a variable current limit signal 174 in response to control signal $V_C$ 170. In one example, variable current limit signal 174 increases from a minimum current limit to a maximum current limit with respect to the control signal $V_C$ 170. Thus for a no load or light load condition, the variable current limit signal 174 is at a minimum current limit, and at full load conditions, the variable current limit signal 174 is at a maximum current limit, which is referred to as 100% $I_{Limit-Max}$.

Figure 2:
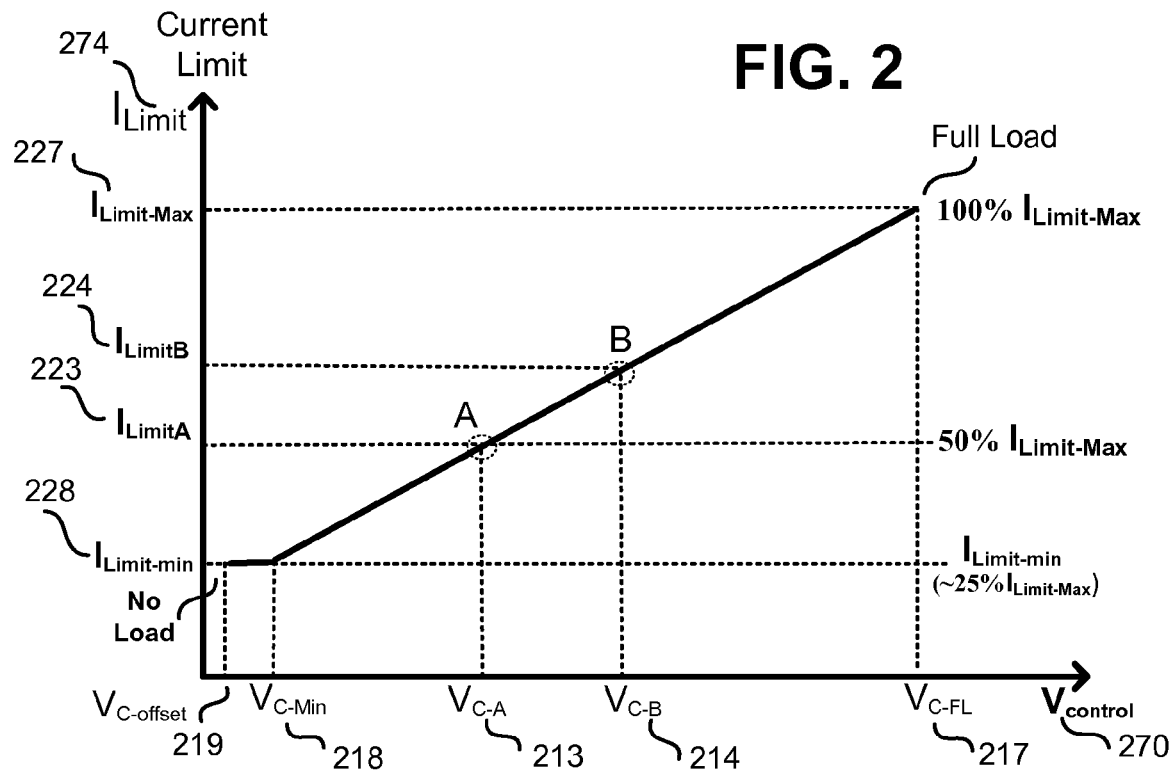
FIG. 2 is an example illustrating an example relationship of current limit with respect to changing load conditions in a power supply controller in accordance with the teachings of the present invention.

To illustrate, FIG. 2 shows an example relationship of the current limit 274, which corresponds to variable current limit signal 174 in FIG. 1, with respect to control signal 270 or changing load conditions, which corresponds to control signal $V_C$ 170 in FIG. 1. As shown, when the control signal $V_C$ 270 is at a minimum control signal value of $V_{C-min}$ 218, the current limit 274 is at a minimum of $I_{LIMIT-min}$ 228. As the control signal $V_C$ 270 increases to a full load condition of $V_{C-FL}$ 217, the current limit 274 increases to a maximum of $I_{Limit-Max}$ 227.

As shown along the x-axis of FIG. 2, it is noted that three ranges of control signal values are defined. The first range of control signal values is defined from $V_{C-Min}$ 218 to $V_{C-A}$ 213. In one example design, $V_{C-A}$ 213 corresponds to a current limit $I_{Limit3}$ 223, which is substantially equal to 50% of $I_{Limit-max}$ 227. The second range of control signal values is defined from $V_{C-A}$ 213 to $V_{C-B}$ 214. In one example, as will be discussed, $V_{C-B}$ 214 corresponds to a current limit $I_{Limit4}$ 224, which is greater than $I_{Limit3}$ 223, less than $I_{Limit-Max}$ 227, and corresponds to the current limit at which the duty cycle of drive signal 155 of FIG. 1 is substantially equal to 50%. In other words, in one example, when the control signal $V_C$ 270 is equal to $V_{C-B}$ 214, the on-time interval of the drive signal 155 is equal to one-half of the time period of a single pulse of the drive signal 155. The third range of control signal values is defined from $V_{C-B}$ 214 to $V_{C-FL}$ 217. As can be observed, the second range of control signal values is greater than the first range of control signal values and the third range of control signal values is greater than the second range of control signal values. It is also noted that in one example, an offset $V_{C-Offset}$ 219 is applied to the control signal $V_C$ 270 for a no load condition, as shown.

Referring back to FIG. 1, in one example, controller 160 also includes a drive signal generator 168 that is labeled "ON-OFF Control" in FIG. 1, which is coupled to receive the variable current limit signal 174 from the current limit adjustment circuit, a current sense signal 152, which is representative of current 151 through power switch 150, and an oscillating signal 172 from an oscillator 164. In one example, drive signal generator 168 generates drive signal 155 in response to the oscillating signal 172. For instance, in one example, each on-time interval of drive signal 155 is initiated with each pulse of the oscillating signal 172. Thus, as the frequency of oscillating signal 172 generated by oscillator 164 increases or decreases, the frequency of drive signal 155 increases or decreases accordingly to vary the switching frequency of power switch 150. In one example, the on-time interval of each pulse of drive signal 155 is terminated by drive signal generator 168 in response to the current sense signal 152 and the variable current limit signal 174. For instance, in one example, when the current 151 through power switch 150 reaches the current limit as indicated by variable current limit signal 174, the on-time interval of the pulse of drive signal 155 is terminated and power switch 150 is turned off for the remainder of the switching cycle until the next switching cycle begins, as initiated by oscillating signal 172.

As mentioned, oscillating signal 172 is generated by oscillator 164. In one example, the frequency of oscillating signal 172 varies across different ranges of control signal values. For instance, as will be discussed, the frequency of the oscillating signal 172 increases from a first frequency to a second frequency with respect to the control signal $V_C$ 170 for a first range of control signal values. The frequency of the oscillating signal 172 then remains substantially equal to the second frequency for a second range of control signal $V_C$ 170 values. The frequency of the oscillating signal 172 then decreases from the second frequency to a third frequency with respect to the control signal $V_C$ 170 for a third range of control signal values. The first range of control signal values is less than the second range of control signal values, and the second range of control signal values is less than the third range of control signal values.

Figure 3:
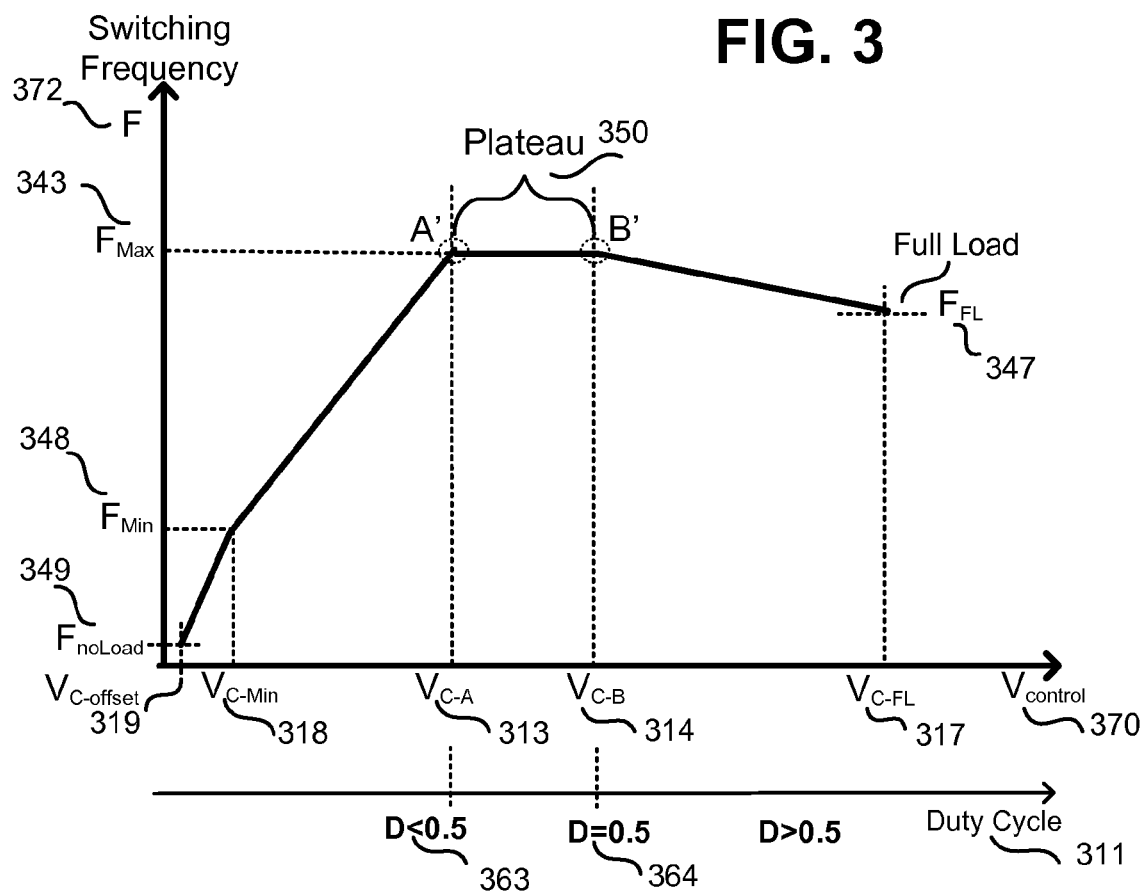
FIG. 3 is an example illustrating an example relationship of switching frequency with respect changing load conditions and a duty cycle of a drive signal in a power supply controller in accordance with the teachings of the present invention.

To illustrate, FIG. 3 shows an example relationship of the switching frequency 372 of drive signal 155 of FIG. 1 with respect to control signal 370 or changing load conditions, which corresponds to control signal $V_C$ 170 in FIG. 1 in accordance with the teachings of the present invention. In addition, the duty cycle 311 of drive signal 155 is also illustrated along the x-axis of FIG. 3 to show the relationship of the switching frequency 372 of drive signal 155 with respect to the duty cycle 311 of drive signal 155 in accordance with the teachings of the present invention.

As shown along the x-axis of FIG. 3, it is noted that the three example ranges of control signal values defined with respect to FIG. 2 are also illustrated in FIG. 3. In particular, the first range of control signal values is defined from $V_{C-Min}$ 318 to $V_{C-A}$ 313. In the example, $V_{C-Min}$ 318 corresponds to a minimum switching frequency $F_{Min}$ 348 in this region and $V_{C-A}$ 313 corresponds to a maximum switching frequency of $F_{Max}$ 343. As shown, when the control voltage 370 is at $V_{C-A}$ 313, the duty cycle 311 is less than 50%, which is labeled as "D<0.5" 363 along the x-axis of FIG. 3.

In the illustrated example, the second range of control signal values is defined from $V_{C-A}$ 313 to $V_{C-B}$ 314. As shown, when the control voltage 370 is at $V_{C-B}$ 314, the switching frequency 372 is maximum switching frequency of $F_{Max}$ 343 and the duty cycle 311 is substantially equal to 50%, which is labeled as "D=0.5" 364 along the x-axis of FIG. 3. Thus, it is appreciated that in the second range of control signal values defined from $V_{C-A}$ 313 to $V_{C-B}$ 314, the switching frequency substantially remains constant at the maximum switching frequency $F_{MAX}$ 343. In other words, while the load increases in the second range of control signal values, the switching frequency remains substantially fixed at $F_{MAX}$ 343 until the duty cycle 311 of drive signal 155 rises to approximately 50%. As can be observed from FIG. 3, it is noted that a plateau 350 is formed with the switching frequency 372 remaining substantially constant at $F_{MAX}$ 343 for the second range of control signal values from $V_{C-A}$ 313 to $V_{C-B}$ 314.

Continuing with the example depicted in FIG. 3, the third range of control signal values is defined from $V_{C-B}$ 314 to $V_{C-FL}$ 317. Thus, as the control signal $V_C$ 370 increases in the third range from $V_{C-B}$ 314 to a full load condition of $V_{C-FL}$ 317, FIG. 3 show that the switching frequency 373 decreases from the maximum switching frequency $F_{MAX}$ 343 to a full load switching frequency $F_{FL}$ 347.

As can be observed, the second range of control signal values is greater than the first range of control signal values and the third range of control signal values is greater than the second range of control signal values. It is also noted that in one example, an offset $V_{C-Offset}$ 319 is applied to the control $V_C$ 270 for a no load condition, at which the switching frequency 373 is at a frequency of $F_{noLoad}$ 349.

With reference to FIGS. 2 and 3, it is noted that, even though not directly related to the present disclosure, at very low loads, the region below the minimum control voltage $V_{C-Min}$ 318 towards $V_{C-offset}$ 319 at no load, when current limit $I_{Limit}$ 274 has been reduced to a minimum value $I_{Limit-min}$ 228 and remains at this level, the switching frequency 372 at $V_{C-Min}$ 318 has been reduced to $F_{Min}$ 348 drops further at an increased rate by a large number of skipped pulses in the drive 155 due to a light load 134 in order to reduce switching loss and increase efficiency.

Figure 4:
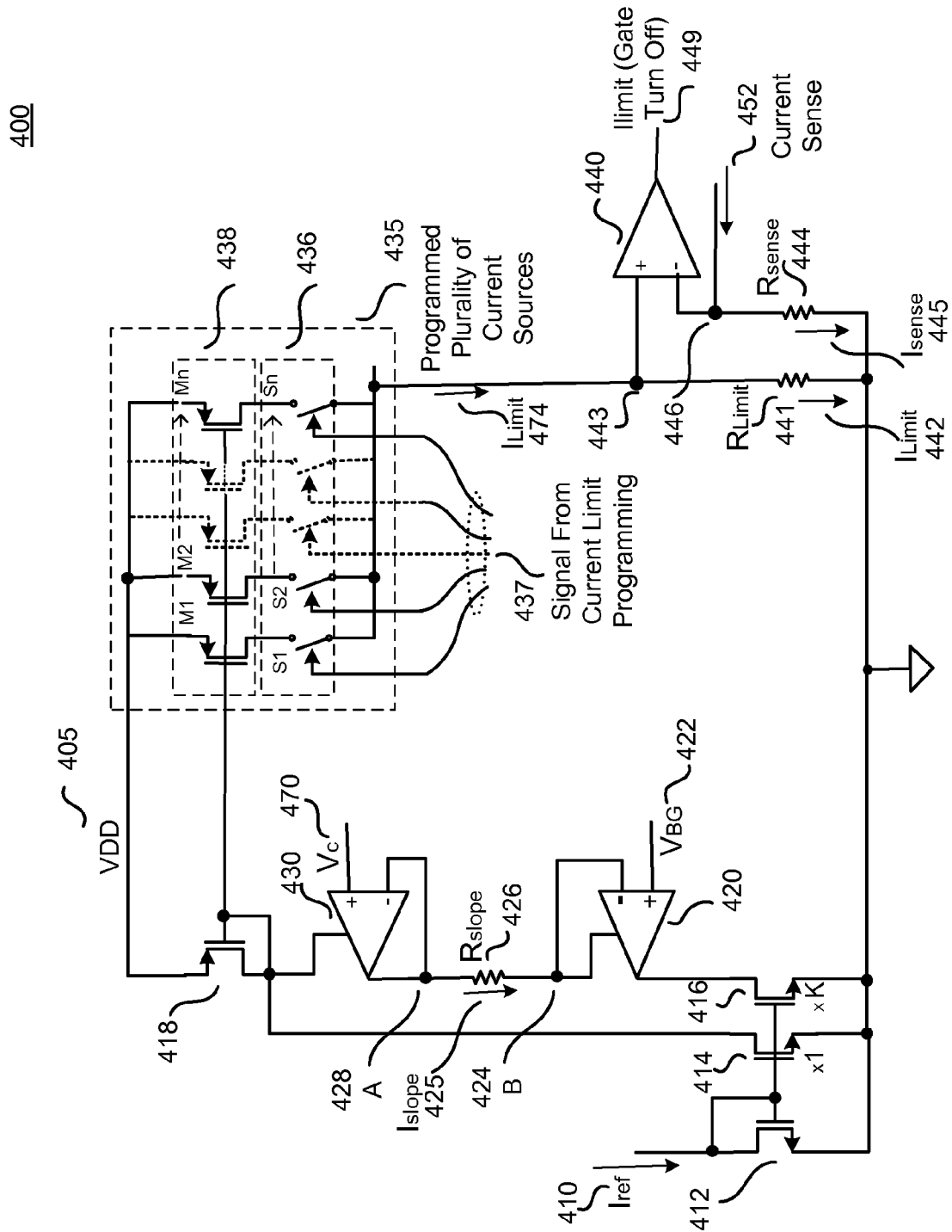
FIG. 4 is a schematic illustrating one example of current limit adjustment circuit in accordance with the teachings of the present invention.

FIG. 4 is a schematic illustrating one example of current limit adjustment circuit 400 in accordance with the teachings of the present invention. In one example, current limit adjustment circuit 400 corresponds with current limit adjustment circuit $I_{Limit}$ 166 of FIG. 1. As shown in the depicted example, current limit adjustment circuit 400 is coupled to receive the control signal 470, which in the illustrated example is representative of the load, and corresponds to control signals $V_C$ 170, 270, and 370 of FIGS. 1-3, respectively. In the example, a diode connected FET 412 receives a reference current Iref 410 and mirrors it to FETs 414 and 416. The FET 414 passes the current from the diode connected FET 418 coupled to VDD 405 supply bus. Current through resistor $R_{Slope}$ 426 is defined by voltage at point A 428 and voltage at point B 424. The buffer 430 receives the control signal $V_C$ 470 at its non-inverting input and is coupled as a voltage follower to adjust $V_A = V_C$ as shown. The buffer 420 receives $V_{BG}$ 422 at its non-inverting input and is coupled as a voltage follower to keep $V_B = V_{BG}$ as shown.

As a result, the current $I_{slope}$ 425 through resistor $R_{slope}$ 426 can be determined as follows:

$$I_{slope} = (V_C - V_{BG})/R_{slope} \quad \text{(Eq. 1)}$$

Thus, the current $I_{slope}$ 425 through diode connected FET 418 is responsive to the control signal $V_C$ 470. In the illustrated example, a coefficient K of the reference current Iref 410 through FET 416 clamps the upper border of $I_{slope}$ 425.

As shown in the depicted example, current through the diode connected FET 418 is mirrored through a programmed plurality of current sources 435, which includes a plurality of mirrored current sources 438 (M1, M2, . . . Mn) that are selectively coupled in parallel through plurality of switches 436 (S1, S2, . . . Sn), and controlled by a signal from a current limit programming circuit 437 as shown. As a result, the total programmed variable current limit $I_{Limit}$ 474 across the resistor $R_{Limit}$ 441 generates voltage 443 to the non-inverting input of comparator 440. In one example, variable current limit $I_{Limit}$ 474 of FIG. 4 corresponds to variable current limit 174 of FIG. 1. Referring back to FIG. 4, a current sense signal 452 is coupled to be received by resistor $R_{sense}$ 444. In one example, current sense signal 452 of FIG. 4 corresponds to current sense signal 152 of FIG. 1, and is therefore representative of the current 151 through the power switch 150. Referring back to the example of FIG. 4, resistor $R_{sense}$ 644 generates voltage 446, which is applied to the inverting input of comparator 440. Thus, as soon as current 151 in the main power switch 150 of the power converter reaches the current limit, as indicated with variable current limit $I_{Limit}$ 474 in response to the control voltage $V_C$ 430, the gate turn-off signal 449 at output of comparator 440 is coupled to terminate the on-time interval of drive signal 155 to turn off power switch 150 for this switching cycle.

Figure 5A:
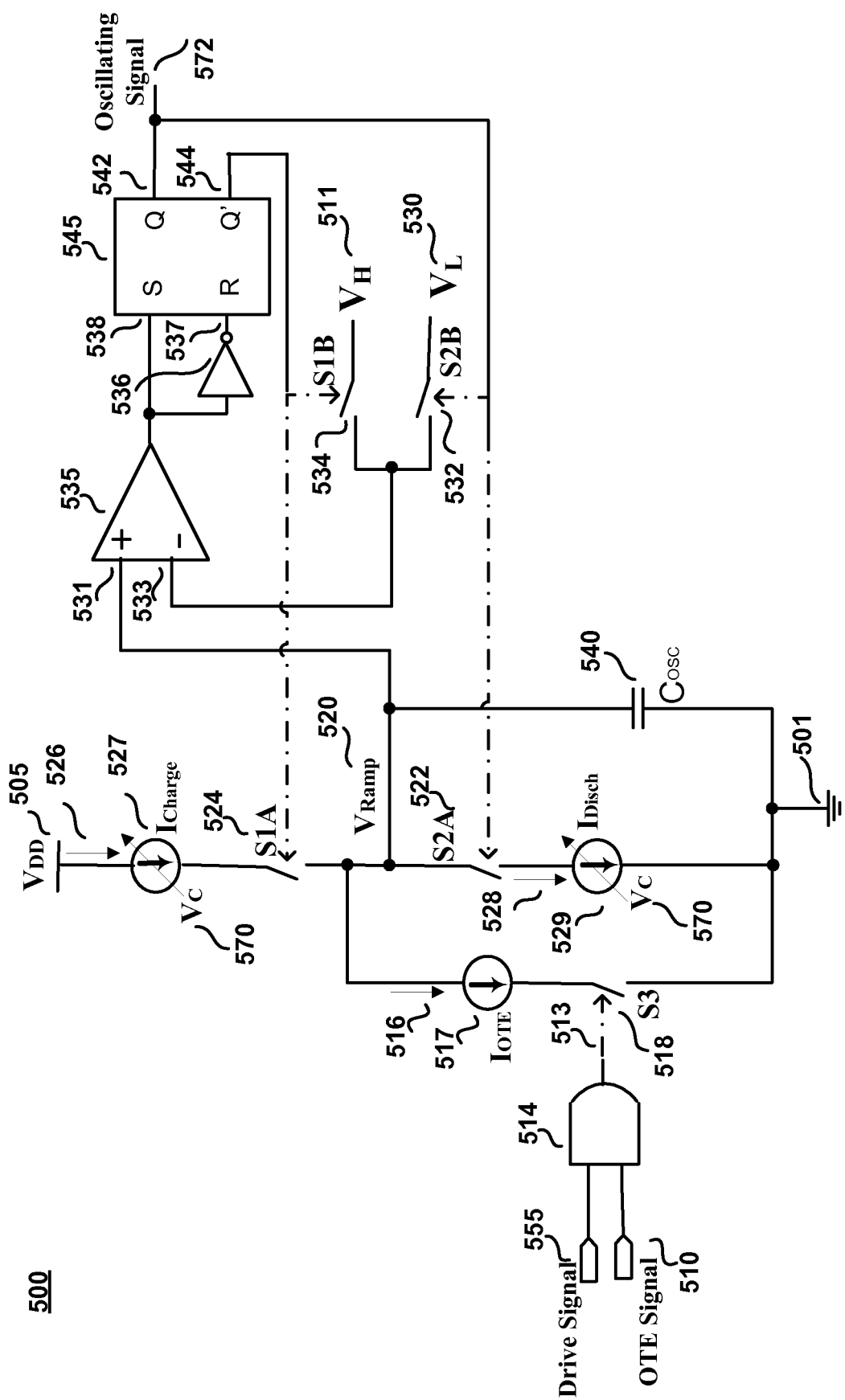
FIG. 5A illustrates a simplified circuit block example of an oscillator that generates a variable frequency oscillating signal in accordance with the teachings of the present invention.

FIG. 5A illustrates a simplified circuit block example of an oscillator 500 that generates a variable frequency oscillating signal 572. In one example, oscillator 500 and oscillating signal 572 correspond to oscillator 164 and oscillating signal 172 of FIG. 1, respectively. Accordingly, in one example, drive signal 155 is generated in response to oscillating signal 572. Referring back to the example of FIG. 5A, oscillator 500 varies the frequency of oscillating signal 572 according to the example described with respect to FIG. 3, by symmetrically charging and discharging the oscillator main capacitance $C_{OSC}$ 540 with charging/discharging slopes in response to the control signal $V_C$ 570, which is representative of the output load change. In the example, control voltage $V_C$ 570 corresponds to control signals $V_C$ 170, 270, 370 and 470 of FIGS. 1-4, respectively. In addition, oscillator 500 varies the frequency of oscillating signal 572 further in response to the duty cycle of the drive signal 155, as indicated by an on-time extension signal, which is labeled as OTE signal 510 in FIG. 5A. In one example, OTE signal 510 is inactive at the beginning of each on-time interval of the drive signal 155, and becomes active when the on-time interval of drive signal 155 exceeds 50% of period at maximum frequency $F_{Max}$ 343, as shown in FIG. 3, or in other words, when the duty cycle 311 of the drive signal 155 is greater than or equal to 0.5 at the maximum frequency $F_{Max}$ 343. Thus, in one example, OTE signal 510 becomes active as soon as the duty cycle is greater than or equal to "D=0.5" 364 along the x-axis of FIG. 3.

For instance, as shown in the example of FIG. 5A, when the latch 545 is in a reset condition, which is when input R 537 is high, the inverted/complementary output Q' 544 of the latch 545 goes high and closes switch S1A 524 and switch S1B 534. By closing switch S1A 524, the main capacitance $C_{osc}$, 540 of the oscillator 540 starts to linearly charge from the supply bus $V_{DD}$ 505, with a constant current 526, through the variable current source $I_{Charge}$ 527 that is controlled by the control voltage $V_C$ 570 in response to the load change at the output of the power supply. The voltage $V_{Ramp}$ 520 across the capacitance $C_{osc}$ 540 rises linearly and switch S1B 534 applies the higher threshold $V_H$ 511 to the inverting input 533 of the comparator 535.

When $V_{Ramp}$ 520 at the non-inverting input 531 of comparator 535 has ramped up to the threshold $V_H$ 511, the output of comparator 535 goes high at terminal S 538. In addition, the inverter 536 lowers the signal 537 at input R of the latch 545. As a result, output Q 542 goes high and output Q' 544 is pulled low, which results in switches S1A 524 and S1B 534 to open and switches S2A 522 and S2B 532 to close, thus ending the charging period and starting the discharging period of capacitance $C_{OSC}$ 540. When switch S2B 532 is closed, the lower threshold $V_L$ 530 is applied to the inverting input 533 of the comparator 535. As a result, the voltage $V_{Ramp}$ 520 across the capacitance $C_{osc}$ 540 discharges down to $V_L$ 530, with a constant current 728 through the variable current source $I_{Disch}$ 529, which is controlled by the control signal $V_C$ 570 in response to the load coupled to the power supply output. The total charging and discharging periods of the capacitance $C_{osc}$ 540 defines one cycle of the oscillator and the switching frequency of oscillating signal 572 in response to the control signal Vc 570 and the load change.

In one example, it is appreciated that the current sources $I_{Charge}$ 527 and $I_{Disch}$ 529 vary in response to changes in the control signal $V_C$ 570 from lower control signal values up to a control signal value corresponding to $V_{C-A}$ 213 of FIG. 2 or $V_{C-A}$ 313 of FIG. 3. As shown in FIGS. 2 and 3, a control signal $V_C$ 270 value of $V_{C-A}$ 213 corresponds to a current limit of 50% of the maximum current limit $I_{Limit-Max}$ 227. Furthermore, when the control signal $V_C$ 370 has reached $V_{C-A}$ 313, the switching frequency 372 has increased to a maximum switching frequency of $F_{MAX}$ 343, while the duty cycle of the drive signal 155 is still less than 50%. For control signal $V_C$ 570 values that are greater than $V_{C-A}$ 313, the currents through variable current sources $I_{Charge}$ 527 and $I_{Disch}$ 529 remain the same in order to maintain the maximum switching frequency $F_{MAX}$ 343, as illustrated at the plateau 350 in FIG. 3.

As mentioned previously, when the control signal $V_C$ 570 rises to a value greater than $V_{C-B}$ 314, as shown in FIG. 3 and which corresponds to a duty cycle of greater than 50%, the OTE signal 510 becomes active, which is coupled to be received by one input of AND gate 514. The other input of AND gate 514 is coupled to receive the drive signal 555, which corresponds to drive signal 155 of FIG. 1. Thus, when the drive signal 555 is active and when OTE signal 510 is active, which indicates that the on-time interval of the drive signal 555 has exceeded a 50% duty cycle, the output of AND gate 513 turns on switch S3 518, which activates current source $I_{OTE}$ 517 to draw a current 516 from capacitance $C_{OSC}$ 540 to ground 501 through switch S3 518. In one example, current 516 is a constant current that is a fraction of charging current 526 and therefore reduces the charging current rate of the capacitance $C_{osc}$ 540 in a portion of the charging interval when drive signal 555 and OTE signal 510 are both active. As a result, when current source $I_{OTE}$ 517 is activated in response to OTE signal 510 and duty cycles of greater than 50%, the charging slope of $V_{RAMP}$ 520 is reduced for the portion of on-time interval that both the drive signal 555 that OTE signal 510 are active. As a result, on-time and duty cycle can be extended beyond the 50% and the switching frequency 373 is reduced, as illustrated in FIG. 3. It is appreciated that as the load increases, the control signal $V_C$ 370 increases and the duty cycle increases, which increases the amount of time that the OTE signal 510 is active, which further decreases the switching frequency 373, as shown in FIG. 3 for the third range of control signal values from $V_{C-B}$ 314 to $V_{C-FL}$ 317.

Figure 5B:
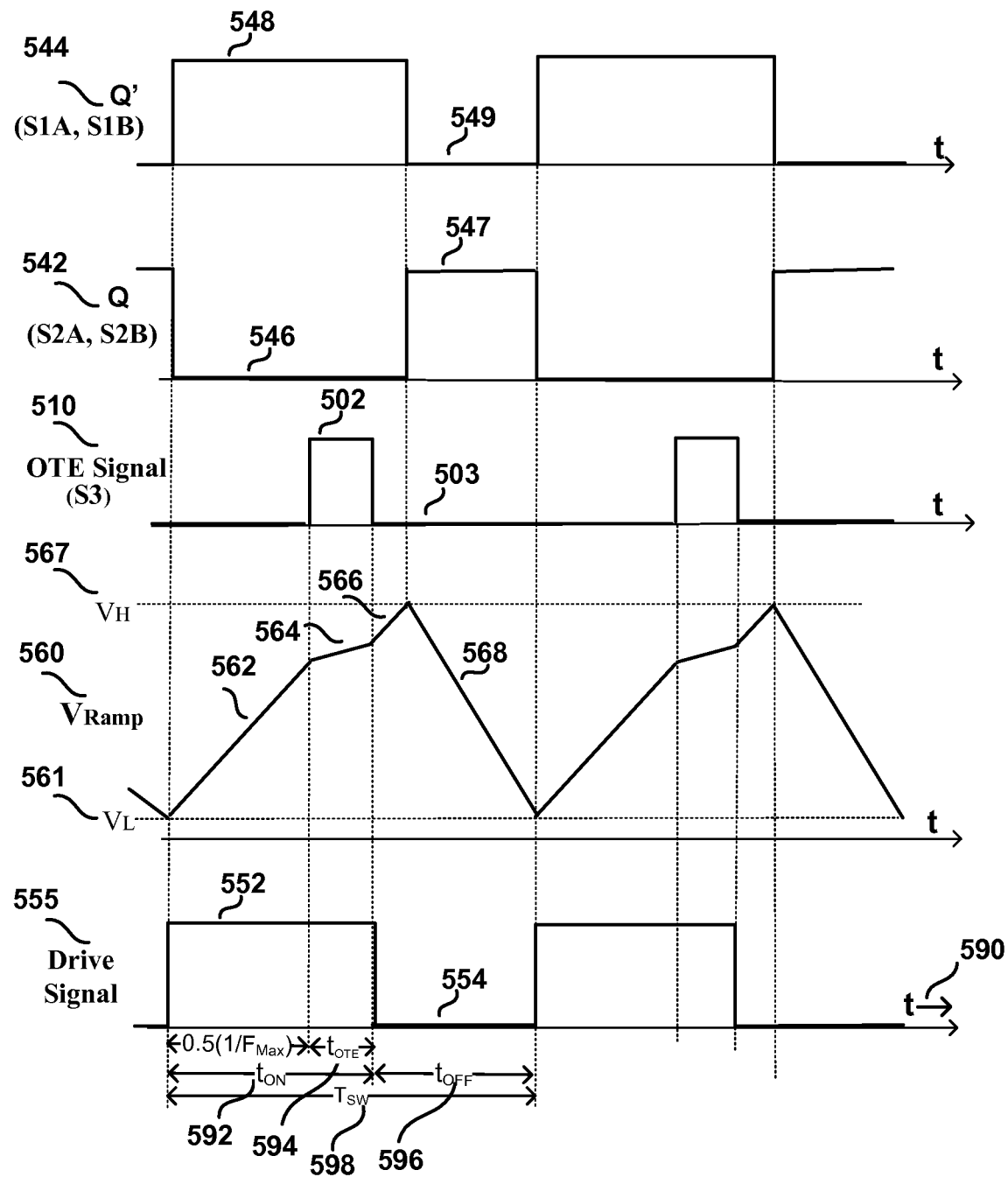
FIG. 5B is an example timing diagram that illustrates waveforms according to the circuit block example of FIG. 5A in accordance with the teachings of the present invention.

FIG. 5B is an example timing diagram that illustrates waveforms according to the circuit block example of FIG. 5A in accordance with the teachings of the present invention. In particular, FIG. 5B presents some example waveforms according the circuit block of FIG. 5A versus time 590 when operation is in the third region of control signal $V_C > V_{C-B}$, which is when drive signal 555 and OTE signal 510 are both active, the on-time and duty cycle has been extended beyond 50%, the switching period increases and the switching frequency decreases in response to a gradual increase in load. In the example, signal Q' 544 controls switches S1A and S1B. When signal Q' 544 is high 548, both switches S1A and S1B are closed, charging the oscillator capacitance $C_{osc}$ 540, which corresponds to $V_{Ramp}$ 560 ramping up to $V_H$ 567 as shown. When signal Q' 544 is low 549, both switches S1A and S1B are open. The signal Q 542 is complementary of signal Q' 544, and controls S2A and S2B for discharging the oscillator capacitance $C_{osc}$ 540. When signal Q' 544 is low 549, signal Q 542 goes high 547 and discharges oscillator capacitance $C_{osc}$ 540, which corresponds to $V_{Ramp}$ 560 ramping down 568 to $V_L$ 561. For the example of FIG. 5B, in an extended on-time modulated off-time mode of operation, the charging slope 562 is defined by current source $I_{Charge}$ 527 but when the drive signal 555 on-time has exceeded $0.5(1/F_{Max})$ and OTE signal 510 is activated 502 to close switch S3, 518 the current source $I_{OTE}$ 517 reduces the charging rate 564 for the duration of OTE signal 510 activation $t_{OTE}$ 594. The OTE signal 510 remains active until the drain current 151 reaches current limit $I_{Limit}$ 166, as illustrated for example in FIG. 1, and the on-time interval $t_{ON}$ 592 is terminated, which begins the off-time $t_{OFF}$ 596 with the drive signal 555 in an inactive state 554. Then, the charging slope 566 continues with the original slope 562 up to the higher charging threshold $V_H$ 567, after which S1A and S1B are opened, S2A and S2B are closed and the voltage $V_{Ramp}$ 560 across the oscillator capacitance $C_{osc}$ 540 decreases with slope 568 defined by the current source $I_{Disch}$ 529. As shown, $V_{Ramp}$ 560 ramps down to $V_L$ 561, at which point the switching period $T_{sw}$ 598 is complete and a new switching cycle begins.

As mentioned, it is appreciated that the timing diagram of FIG. 5B illustrates operation in the third region of control signal $V_C > V_{C-B}$ when duty cycle has been extended beyond 0.5 (50%) and the OTE signal is active. However, in the first and second regions of operation (lower loads, $V_C < V_{C-B}$), when OTE signal 510 is not activated and the duty cycle is still below 0.5 (50%), the charging (rising) portion of voltage $V_{Ramp}$ 560 across the oscillator capacitance $C_{osc}$ 540 monotonically increases from lower threshold $V_L$ 561 to the higher threshold $V_H$ 567.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A power supply controller, comprising:
    a drive signal generator coupled to generate a drive signal to control a switching of a power switch to control a transfer of energy from an input of a power supply to an output of the power supply;
    a feedback circuit coupled to receive a feedback signal representative of the output of the power supply, the feedback circuit coupled to generate a control signal in response to the feedback signal;
    an oscillator circuit coupled to generate an oscillating signal in response to the control signal, wherein the drive signal generator is coupled to generate the drive signal in response to the oscillating signal, wherein a frequency of the oscillating signal progressively increases from a first frequency to a second frequency with respect to the control signal for a first range of control signal values, wherein the frequency of the oscillating signal remains substantially equal to the second frequency for a second range of control signal values, and wherein the frequency of the oscillating signal decreases from the second frequency to a third frequency with respect to the control signal for a third range of control signal values, wherein the first range of control signal values is less than the second range of control signal values, and wherein the second range of control signal values is less than the third range of control signal values, the third range of control signal values representing a higher load demand on the output of the power supply than the second range of control signal values and the second range of control signal values representing a higher load demand on the output of the power supply than the first range of control signal values; and
    a current limit adjustment circuit coupled to generate a variable current limit signal in response to the control signal, wherein the current limit adjustment circuit is coupled to increase the variable current limit signal from a minimum current limit to a maximum current limit with respect to the control signal for the first, second, and third ranges of control signal values.

2. The power supply controller of claim 1 wherein the first frequency is a minimum frequency of the oscillating signal, wherein the second frequency is a maximum frequency of the oscillating signal, and wherein the third frequency is between the first and second frequencies.

3. The power supply controller of claim 1 wherein the variable current limit signal is representative of approximately half of the maximum current limit at a transition from the first range of control signal values to the second range of control signal values.

4. The power supply controller of claim 1 wherein the drive signal generator is coupled to receive a current sense signal representative of a current through the power switch, wherein the drive signal generator is further coupled to terminate an on-time interval of each pulse of the drive signal in response to the current sense signal and the variable current limit signal.

5. The power supply controller of claim 1 wherein a duty cycle of the drive signal is less than 50% at a transition from the first range of control signal values to the second range of control signal values.

6. The power supply controller of claim 1 wherein a duty cycle of the drive signal is substantially equal to 50% at a transition from the second range of control signal values to the third range of control signal values.

7. The power supply controller of claim 1 wherein the oscillator comprises:
    a first variable current source coupled to a capacitor to charge the capacitor at a charging rate in response to the control signal;
    a second variable current source coupled to the capacitor to discharge the capacitor at a discharging rate in response to the control signal; and
    a third current source coupled to the capacitor to adjust the charging rate during at least a portion of an on-time interval of the drive signal and when the control signal is in the third range of control signal values.

8. The power supply controller of claim 1 wherein the feedback circuit comprises a feedback comparator coupled to receive the feedback signal and a feedback reference signal, wherein the feedback comparator is coupled to generate the control signal in response to the feedback signal and the feedback reference signal.

9. The power supply controller of claim 4 wherein the drive signal generator comprises a current limit comparator coupled to receive the current sense signal and the variable current limit signal, wherein the current limit comparator is coupled to terminate the on-time interval of each pulse of the drive signal in response to the current limit comparator.

10. A method for controlling a switch mode power supply, comprising:
sensing a feedback signal representative of an output of the switch mode power supply;
generating a control signal in response to the feedback signal;
generating a variable current limit signal that increases with respect to the control signal;
generating an oscillating signal with an oscillator circuit in response to the control signal;
generating a drive signal with a drive signal generator to control a switching of a power switch of the switch mode power supply in response to the oscillating signal;
progressively increasing a frequency of the oscillating signal from a first frequency to a second frequency with respect to the control signal for a first range of control signal values;
fixing the frequency of the oscillating signal at the second frequency with respect to the control signal for a second range of control signal values, wherein the second range of control signal values is greater than the first range of control signal values, and wherein the variable current limit signal is representative of approximately half of a maximum current limit at a transition from the first range of control signal values to the second range of control signal values; and
decreasing the frequency of the oscillating signal from the second frequency to a third frequency with respect to the control signal for a third range of control signal values, wherein the third range of control signal values is greater than the second range of control signals values, the third range of control signal values representing a higher load demand on the output of the switch mode power supply than the second range of control signal values and the second range of control signal values representing a higher load demand on the output of the switch mode power supply than the first range of control signals values.

11. The method of claim 10 further comprising:
sensing a current sense signal representative of a current through the power switch of the switch mode power supply;
comparing the current sense signal to a variable current limit threshold; and
terminating an on-time interval of each pulse of the drive signal in response to said comparing the current sense signal to the variable current limit threshold.

12. The method of claim 10 wherein a duty cycle of the drive signal is less than 50% at a transition from the first range of control signal values to the second range of control signal values.

13. The method of claim 10 wherein a duty cycle of the drive signal is substantially equal to 50% at a transition from the second range of control signal values to the third range of control signal values.

14. The method of claim 10 wherein progressively increasing the frequency of the oscillating signal from the first frequency to the second frequency with respect to the control signal for the first range of control signal values comprises increasing a charging rate at which a capacitor of an oscillator is charged and increasing a discharging rate at which the capacitor of the oscillator is discharged when the control signal is in the first range of control signal values.

15. The method of claim 10 wherein decreasing the frequency of the oscillating signal from the second frequency to the third frequency with respect to the control signal for the third range of control signal values comprises reducing a charging rate at which a capacitor of an oscillator is charged during at least a portion of an on-time interval of the drive signal when the control signal is in the third range of control signal values.

16. The method of claim 10 wherein the variable current limit signal is increased with respect to the control signal for the first, second and third ranges of the control signal values.

17. The method of claim 10 wherein generating the control signal in response to the feedback signal comprises comparing the feedback signal to a feedback reference signal and generating the control signal in response to the comparison of the feedback signal to the feedback reference signal.

18. A power supply controller, comprising:
a drive signal generator coupled to generate a drive signal to control a switching of a power switch to control a transfer of energy from an input of a power supply to an output of the power supply;
a feedback circuit coupled to receive a feedback signal representative of the output of the power supply, the feedback circuit coupled to generate a control signal in response to the feedback signal;
an oscillator circuit coupled to generate an oscillating signal in response to the control signal, wherein the drive signal generator is coupled to generate the drive signal in response to the oscillating signal, wherein a frequency of the oscillating signal increases from a first frequency to a second frequency with respect to the control signal for a first range of control signal values, wherein the frequency of the oscillating signal remains substantially equal to the second frequency for a second range of control signal values, and wherein the frequency of the oscillating signal decreases from the second frequency to a third frequency with respect to the control signal for a third range of control signal values, wherein the first range of control signal values is less than the second range of control signal values, and wherein the second range of control signal values is less than the third range of control signal values; and
a current limit adjustment circuit coupled to generate a variable current limit signal in response to the control signal, wherein the current limit adjustment circuit is coupled to increase the variable current limit signal from a minimum current limit to a maximum current limit with respect to the control signal for the first, second, and third ranges of control signal values.

* * * * *